United States Patent
Runkle et al.

(10) Patent No.: US 7,209,469 B2
(45) Date of Patent: *Apr. 24, 2007

(54) METHOD AND SYSTEM FOR PERFORMING RANGING FUNCTIONS IN AN ULTRAWIDE BANDWIDTH SYSTEM

(75) Inventors: Paul R. Runkle, Durham, NC (US); Richard D. Roberts, Vienna, VA (US)

(73) Assignee: Freescale Semiconductor Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/409,984

(22) Filed: Apr. 25, 2006

(65) Prior Publication Data

US 2007/0036085 A1 Feb. 15, 2007

Related U.S. Application Data

(63) Continuation of application No. 10/383,256, filed on Mar. 7, 2003, now Pat. No. 7,042,868.

(60) Provisional application No. 60/362,392, filed on Mar. 8, 2002.

(51) Int. Cl.
*H04B 7/212* (2006.01)
*H04Q 7/20* (2006.01)

(52) U.S. Cl. .................. 370/347; 455/423; 455/456.1

(58) Field of Classification Search ............. 370/347, 370/350, 528, 203, 480, 478; 709/200, 224; 455/423, 456.1, 513, 517, 457, 65, 506; 375/140, 375/130, 150, 253, 377; 342/458, 463, 387
See application file for complete search history.

(56) References Cited

U.S. PATENT DOCUMENTS

| | | | |
|---|---|---|---|
| 5,235,615 A | 8/1993 | Omura | |
| 5,638,371 A | 6/1997 | Raychaudhuri et al. | |
| 5,870,389 A | 2/1999 | Hadar et al. | |
| 6,081,519 A | 6/2000 | Petler | |
| 6,160,802 A | 12/2000 | Barrett | |
| 6,212,176 B1 | 4/2001 | Andersson et al. | |
| 6,505,032 B1 | 1/2003 | McCorkle et al. | |
| 6,795,491 B2 | 9/2004 | Fleming et al. | |
| 7,042,868 B2* | 5/2006 | Runkle et al. ............... | 370/347 |
| 2002/0181439 A1* | 12/2002 | Orihashi et al. ............. | 370/350 |
| 2003/0028286 A1 | 2/2003 | Glenn et al. | |
| 2003/0147480 A1 | 8/2003 | Richards et al. | |

* cited by examiner

*Primary Examiner*—Chi Pham
*Assistant Examiner*—Prenell Jones

(57) ABSTRACT

A process is provided for determining the distance between two devices by sending ranging packets between them. The local device sends a first ranging packet, which the remote device sends holds for a first hold time before sending a second ranging packet in return. The local device also sends a third ranging packet, which the remote device sends holds for a second hold time before sending a fourth ranging packet in return. If the second hold time is twice the first hold time, then the propagation time for signals between the two devices can be determined solely by time measurements made by the local device. For received signals, these time measurements can be adjusted to provide accurate time estimates for a direct line of sight signal, which corresponds to a shortest transmission distance between the two devices. The propagation time can then be used to determine distance between the devices.

21 Claims, 12 Drawing Sheets

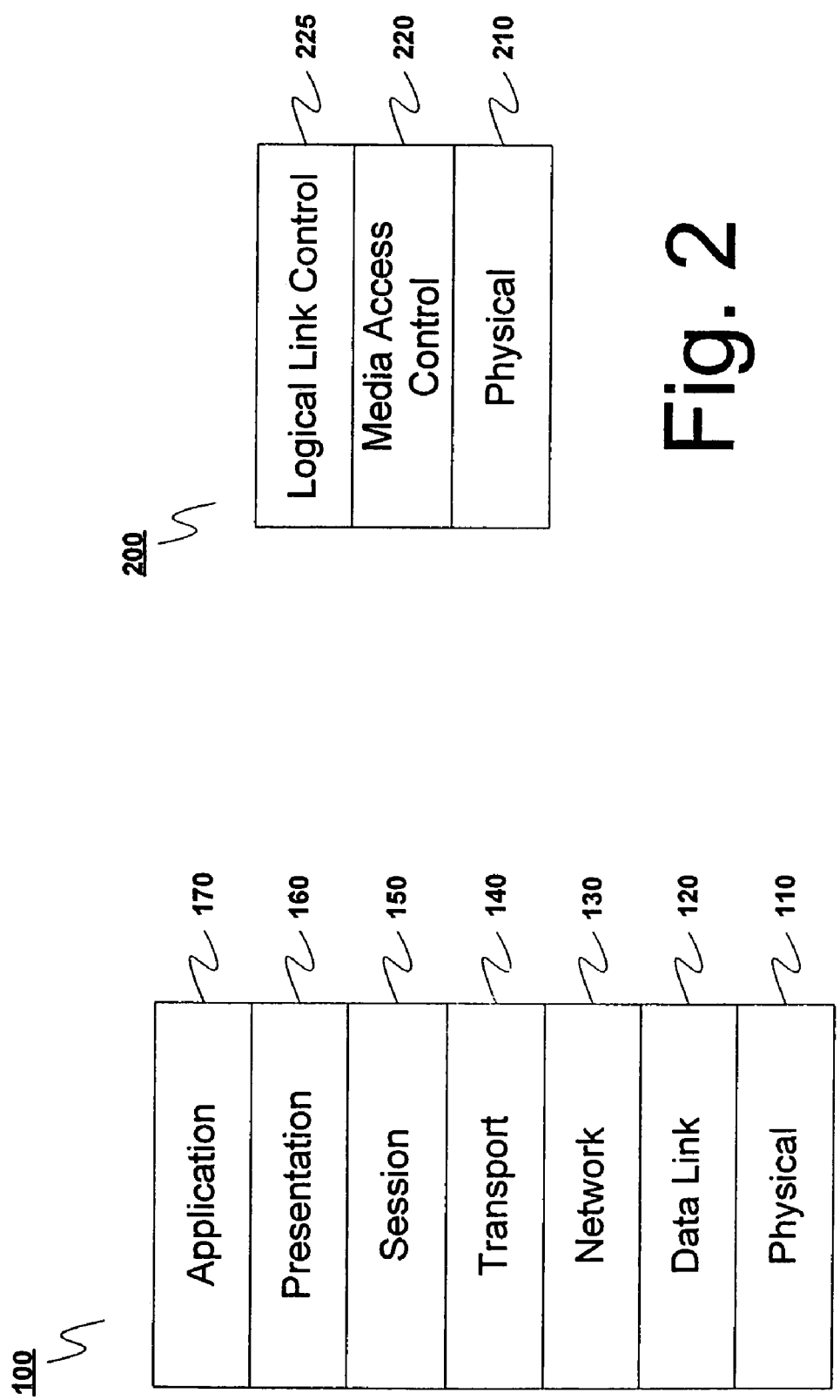

METHOD AND SYSTEM FOR PERFORMING RANGING FUNCTIONS IN AN ULTRAWIDE BANDWIDTH SYSTEM

CROSS-REFERENCE TO RELATED PATENT DOCUMENTS

This application is a continuation application of U.S. patent application Ser. No. 10/383,256, filed Mar. 7, 2003 now U.S. Pat. No. 7,042,868, entitled METHOD AND SYSTEM FOR PERFORMING RANGING FUNCTIONS IN AN ULTRAWIDE BANDWIDTH SYSTEM, which relies for priority on U.S. provisional application Ser. No. 60/362,392, by Paul R. Runkle and Richard D. Roberts, filed Mar. 8, 2002, entitled "A METHOD OF PERFORMING RANGING FUNCTIONS IN AN ULTRAWIDE BANDWIDTH SYSTEM," the contents of which is hereby incorporated by reference in its entirety.

BACKGROUND OF THE INVENTION

The present invention relates to ultrawide bandwidth (UWB) transmitters, receivers and transmission schemes. More particularly, the present invention relates to a method and system for performing ranging functions in a UWB system.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course if the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

FIG. 4 is a block diagram of a device 310, 320 from the network 300 of FIG. 3. As shown in FIG. 4, each device (i.e., each coordinator 310 or non-coordinator device 320) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 430 include the functionality of the device 310, 320. These upper layers 430 may include a logical link control (LLC) or the like. The upper layers allow the MAC layer 420 to interface with various protocols, such as TCP/IP, TCP, UDP, RTP, IP, USB, 1394, UDP/IP, ATM, DV2, MPEG, or the like.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

The present invention provides a method of coordinating devices 310, 320 either operating in a network 300 or trying to join a network 300 through the use of cyclic beacons inside superframes that define the data path across the network 300.

Device IDs and MAC Addresses

One important aspect of working with devices 310, 320 in a network 300 is uniquely identifying each of the devices 310, 320. There are several ways in which this can be accomplished.

Independent of any network it is in, each device 310, 320 has a unique MAC address that can be used to identify it. This MAC address is generally assigned to the device by the manufacturer such that no two devices 310, 320 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 320 in the network 300 to use in addition its unique MAC address. In the preferred embodiments the MAC 420 uses ad hoc device IDs to identify devices 310, 320. These device IDs can be used, for example, to route frames within the network 300 based on the ad hoc device ID of the destination of the frame. The device IDs are generally much smaller than the MAC addresses for each device 310, 320. In the preferred embodiments the device IDs are 8-bits and the MAC addresses are 48-bits.

Each device 310, 320 should maintain mapping table that maps the correspondence between device IDs and MAC addresses. The table is filled in based on the device ID and MAC address information provided to the non-coordinator devices 320 by the coordinator 310. This allows each device 310, 320 to reference themselves and the other devices in the network 300 by either device ID or MAC address.

Packets

Information is preferably passed between devices in the network through the use of packets. FIG. 5 is a block diagram of a data packet according to a preferred embodiment of the present invention.

As shown in FIG. 5, the packet 500 includes a preamble 510, a header 520, and data 530. Each portion of the packet is made up of a series of pulses (or wavelets) representing the bits of data in that portion of the packet 500.

In the preamble 510, a transmitting device sends a known sequence of signals (e.g., a pattern of one particular code word and its inverse). A receiving device listens for this known sequence in order to properly lock onto the signal from the transmitting device. Preferably no substantive data is sent in the preamble 510 since the receiving device is still getting its timing synchronized with that of the transmitting device. The header 520 includes information about the intended recipient of the packet 500 and other identifying information. The data 530 includes the substantive data being transmitted by the packet 500.

UWB Signals

One embodiment of a UWB system uses signals that are based on trains of short duration wavelets (also called pulses) formed using a single basic wavelet shape. The interval between individual wavelets can be uniform or variable, and there are a number of different methods that can be used for modulating the wavelet train with data for communications. One common characteristic, however, is that the wavelet train is transmitted without translation to a higher carrier frequency, and so UWB is sometimes also termed "carrier-less" radio. In other words, in this embodiment a UWB system drives its antenna directly with a baseband signal.

Another important point common to UWB systems is that the individual wavelets are very short in duration, typically much shorter than the interval corresponding to a single bit, which can offer advantages in resolving multipath components. A general UWB pulse train signal can thus be represented as a sum of pulses shifted in time, as shown in Equation (1):

$$s(t) = \sum_{k=-\infty}^{\infty} a_k p(t - t_k) \tag{1}$$

Here s(t) is the UWB signal, p(t) is the basic wavelet shape, and $a_k$ and $t_k$ are the amplitude and time offset for each individual wavelet. Because of the short duration of the wavelets, the spectrum of the UWB signal can be several gigahertz or more in bandwidth. An example of a typical wavelet stream is shown in FIG. 6. Here the wavelet is a Gaussian mono-pulse with a peak-to-peak time ($T_{p\text{-}p}$) of a fraction of a nanosecond, a wavelet period $T_w$ of several nanoseconds, and a bandwidth of several gigahertz. In alternate implementations, differing types of mono-pulses can be used.

SUMMARY OF THE INVENTION

Consistent with the title of this section, only a brief description of selected features of the present invention is now presented. A more complete description of the present invention is the subject of this entire document.

An object of the present invention is to provide a method of determining the propagation time of a packet that requires on time measurements at only a single device.

Another object of the present invention is provide a method of determining when an earliest multipath component of a signal arrives at a device.

These and other objects are accomplished by way of a method of determining a propagation time in a signal path of a wireless network. This method comprises sending a first ranging packet from the local device to the remote device at a first time; receiving the first ranging packet at the remote device at a second time, where the second time is equal to the first time plus the propagation time; sending a second ranging packet from the remote device to the local device at a third time, where the third time is equal to the second time plus a first hold time; receiving the second ranging packet at the local device at a fourth time, where the fourth time is equal to the third time plus the propagation time; sending a third ranging packet from the local device to the remote device at a fifth time; receiving the third ranging packet at the remote device at a sixth time, where the sixth time is equal to the fifth time plus the propagation time; sending a fourth ranging packet from the remote device to the local device at a seventh time, where the seventh time is equal to the sixth time plus a second hold time, the second hold time being different from the first hold time; receiving the fourth ranging packet at the local device at a eighth time, where the eighth time is equal to the seventh time plus the propagation time; and calculating the propagation time at the local device as a function of the first time, the fourth time, the fifth time, the eighth time, and a proportion between the first hold time and the second hold time.

The method may further comprise calculating a distance between the local device and the remote device to be equal to the propagation time multiplied by the speed of light.

The second hold time is preferably twice the first hold time. In this case, the propagation time is equal to the difference between the fourth time and the first time minus half the difference between the eighth time and the fifth time.

The first ranging packet preferably comprises a plurality of multipath components arriving at different times at the remote device. And the second time preferably represents an earliest received time at which an earliest multipath component from the plurality of multipath components arrives at the remote device.

The method may further comprise acquiring an acquired multipath component at the remote device from the plurality of multipath components, the acquired multipath component being different from the earliest received multipath component; determining the earliest received time by processing the acquired multipath component and the plurality of received multipath components to locate the earliest received multipath component, and identify the earliest received time associated with the earliest received multipath component; and determining the second time to be the earliest received time.

The step of determining the earliest received multipath component may further comprise identifying all incoming signals received at the remote device within a maximum duration prior to receiving the acquired multipath component; comparing the received incoming signals to a noise threshold; locating an earliest received incoming signal that is above the noise threshold; and determining the earliest received incoming signal to be the earliest received multipath component.

The second ranging packet preferably comprises a plurality of multipath components arriving at different times at the local device. And the fourth time preferably represents an earliest received time at which an earliest multipath component from the plurality of multipath components arrives at the local device.

The method may further comprise acquiring an acquired multipath component at the local device from the plurality of multipath components, the acquired multipath component being different from the earliest received multipath component; determining the earliest received time by processing the acquired multipath component and the plurality of received multipath components to locate the earliest received multipath component, and identify the earliest received time associated with the earliest received multipath component; and determining the fourth time to be the earliest received time.

The step of determining the earliest received multipath component may further comprise: identifying all incoming signals received at the local device within a maximum duration prior to receiving the acquired multipath component; comparing the received incoming signals to a noise threshold; locating an earliest received incoming signal that is above the noise threshold; and determining the earliest received incoming signal to be the earliest received multipath component.

The third ranging packet preferably comprises a plurality of multipath components arriving at different times at the remote device. And the fifth time represents an earliest received time at which an earliest multipath component from the plurality of multipath components arrives at the remote device.

The method may further comprise: acquiring an acquired multipath component at the remote device from the plurality of multipath components, the acquired multipath component being different from the earliest received multipath component; determining the earliest received time by processing the acquired multipath component and the plurality of received multipath components to locate the earliest received multipath component, and identify the earliest received time associated with the earliest received multipath component; and determining the fifth time to be the earliest received time.

The step of determining the earliest received multipath component may further comprise: identifying all incoming signals received at the remote device within a maximum duration prior to receiving the acquired multipath component; comparing the received incoming signals to a noise threshold; locating an earliest received incoming signal that is above the noise threshold; and determining the earliest received incoming signal to be the earliest received multipath component.

The fourth ranging packet preferably comprises a plurality of multipath components arriving at different times at the local device. And the eighth time preferably represents an earliest received time at which an earliest multipath component from the plurality of multipath components arrives at the local device.

The method may further comprise: acquiring an acquired multipath component at the local device from the plurality of multipath components, the acquired multipath component being different from the earliest received multipath component; determining the earliest received time by processing the acquired multipath component and the plurality of received multipath components to locate the earliest received multipath component, and identify the earliest received time associated with the earliest received multipath component; and determining the eighth time to be the earliest received time.

The step of determining the earliest received multipath component may further comprise: identifying all incoming signals received at the local device within a maximum duration prior to receiving the acquired multipath component; comparing the received incoming signals to a noise threshold; locating an earliest received incoming signal that is above the noise threshold; and determining the earliest received incoming signal to be the earliest received multipath component.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIG. 1 is a diagram showing the hierarchy of the seven-layered OSI standard;

FIG. 2 is a diagram showing the IEEE 802 standard;

DETAILED DESCRIPTION OF THE PREFERRED EMBODIMENTS

Figure 3:
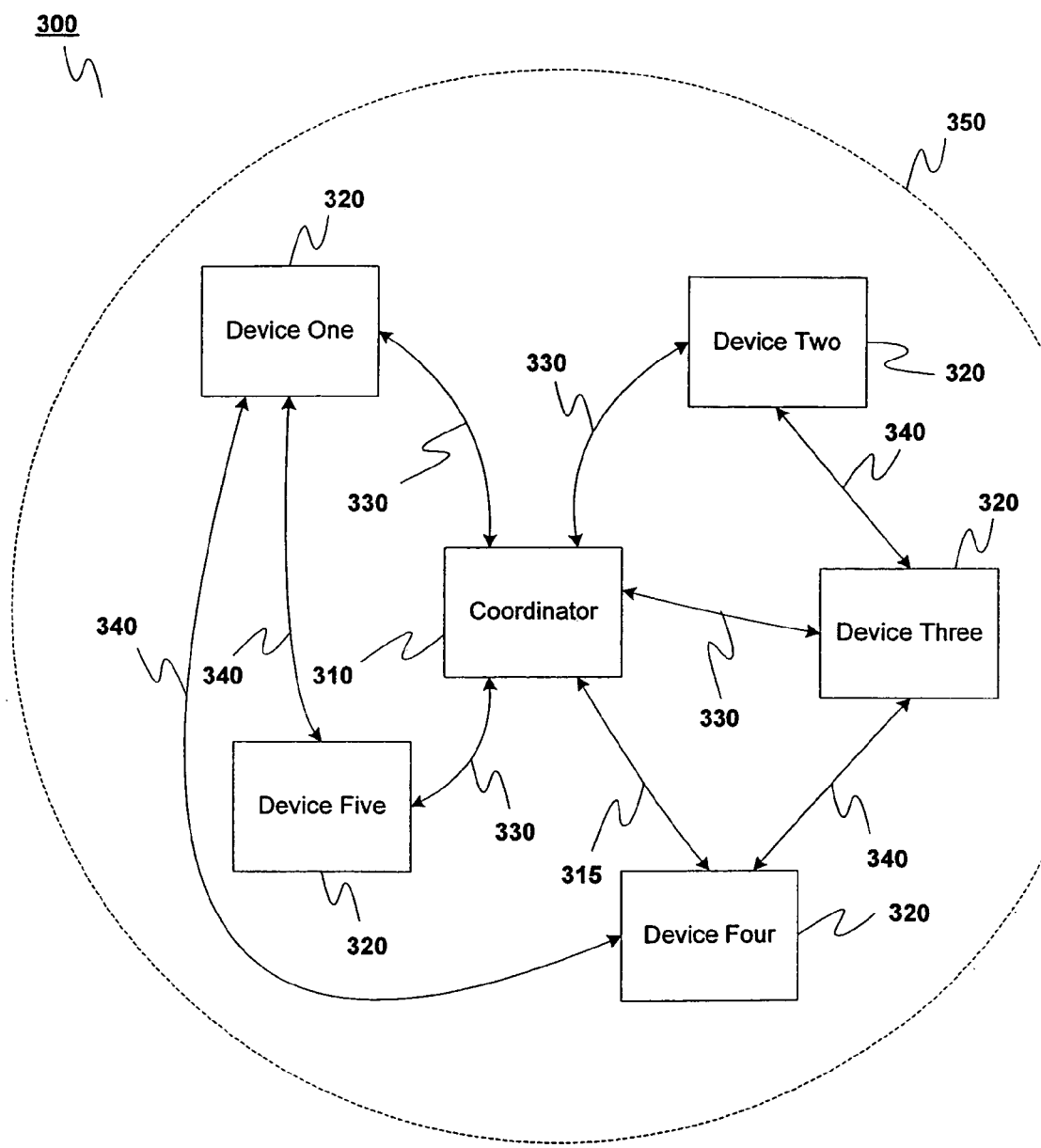
FIG. 3 is a block diagram of a wireless network according to a preferred embodiment of the present invention.
Figure 4:
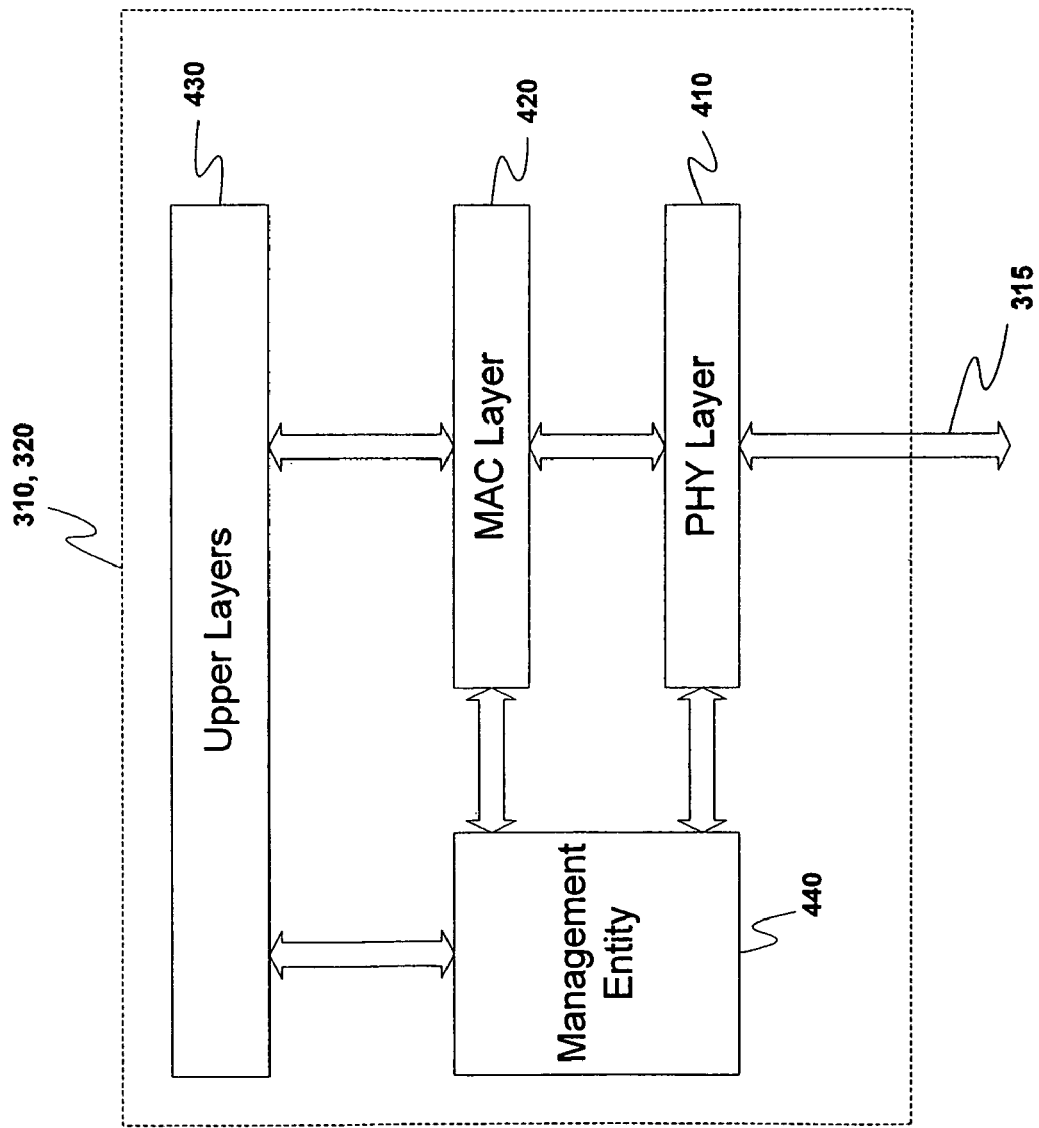
FIG. 4 is a block diagram of a device from the network of FIG. 3.
Figure 5:
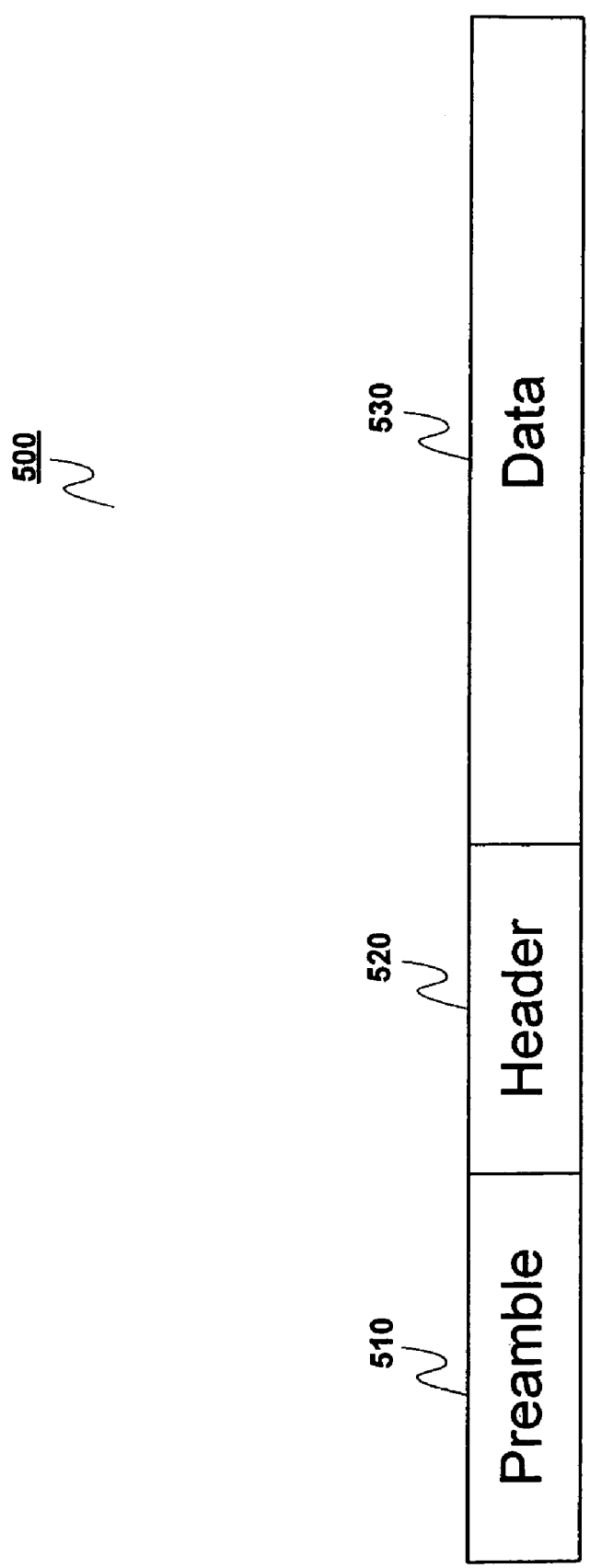
FIG. 5 is a block diagram of a data packet according to a preferred embodiment of the present invention.

Preferred embodiments of the present invention will now be described with reference to the drawings. Throughout the several views, like reference numerals designate identical or corresponding parts.

Given the properties of ultrawide bandwidth (UWB) signals, they are well suited to providing ranging functions. However, it is necessary to provide an implementation that will allow a given device in a UWB network to perform such a ranging function with an acceptable degree of accuracy.

Communication Between Two Devices

Figure 7:
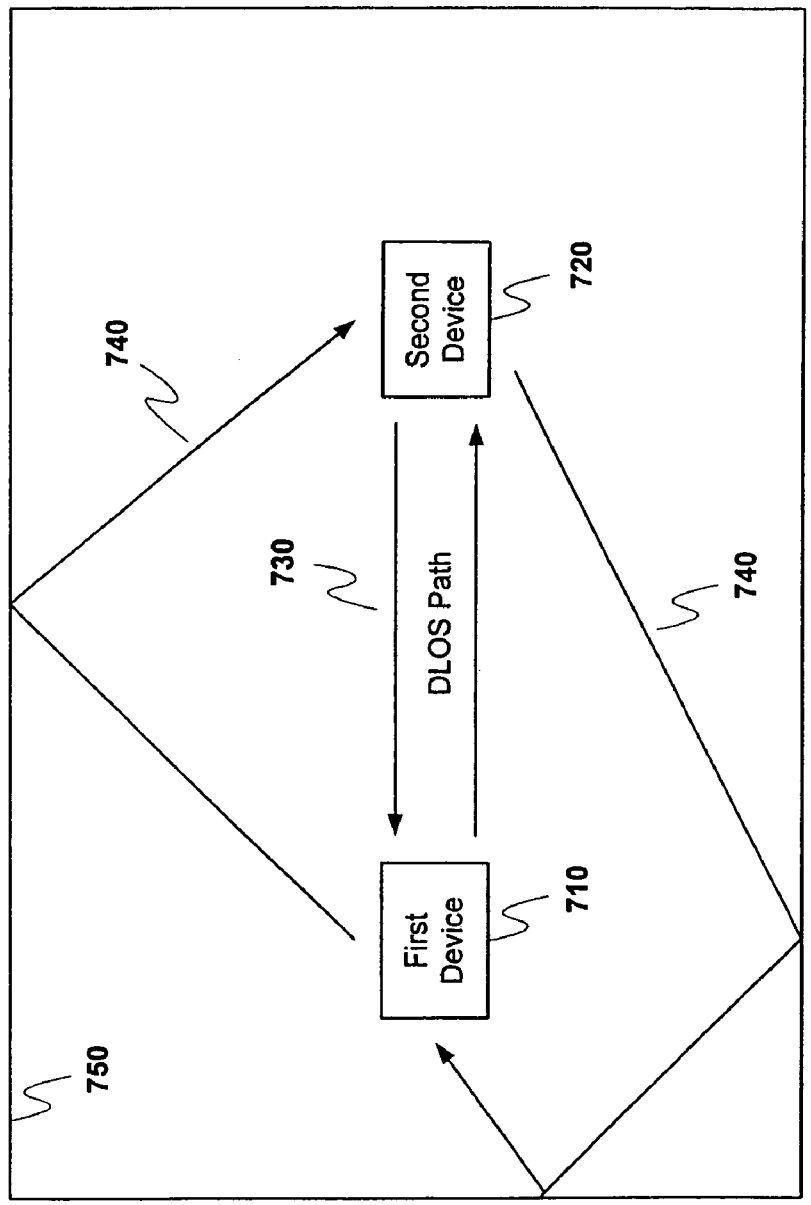
FIG. 7 is a block diagram showing a pair of devices in a basic UWB network.

FIG. 7 is a block diagram showing a pair of devices in a basic UWB network. These devices can be coordinators 310 or non-coordinator devices 320.

As shown in FIG. 7, this portion of the network 300 contains first and second devices 710 and 720, which communicate with each other via wireless transmissions 730 and 740. Some of the transmissions follow a direct line of sight (DLOS) path 730, and others reflect off of interfering structures 750, such as walls, furniture, people, and the like, following a reflected path 740.

Figure 8:
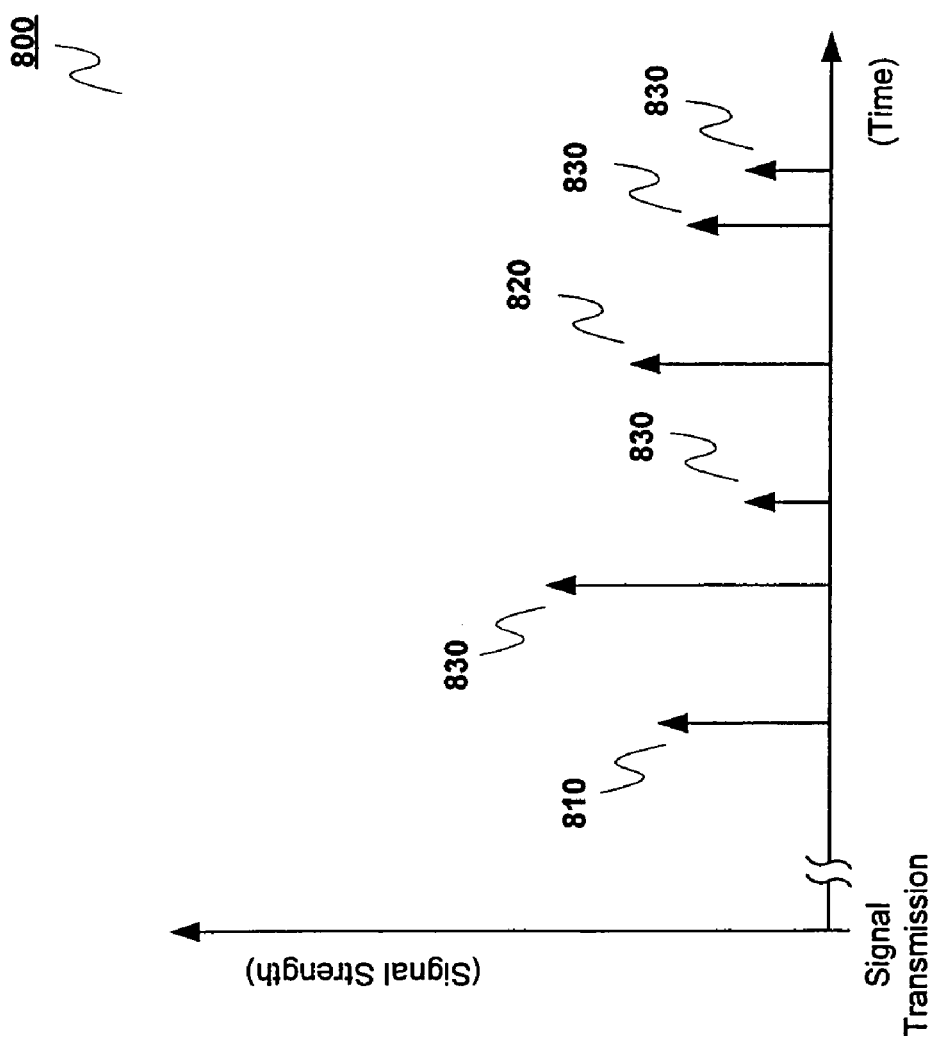
FIG. 8 is a graph of channel response for signals transmitted between two devices according to a preferred embodiment of the present invention.

FIG. 8 is a graph of channel response for signals transmitted between two devices according to a preferred embodiment of the present invention. As shown in FIG. 8, when a transmitter (e.g., the first device 710) sends a wireless signal to the receiver (e.g., the second device 720), the receiver will be subject to several multipath signal components 810, 820, 830 of the transmitted signal. These multipath signal components 810, 820, 830 represent the various direct and reflected signals that are received at the receiver.

The earliest received multipath signal 810 will generally correspond to the multipath signal received along the DLOS path 730. Since the DLOS path 730 is the shortest distance that a signal can travel between the transmitter and receiver, any signal following that path will always arrive first at the receiver. This is because the propagation time of the signal between the transmitter and the receiver is directly proportional to the distance the signal travels.

In many cases, even if there is an obstruction between the transmitter and receiver, a multipath signal will follow the DLOS path 730 and arrive at the receiver. It may suffer some attenuation due to passing through the obstruction, but can arrive at the receiver nevertheless.

However, in some cases an obstruction located between the transmitter and receiver may completely block the DLOS path 730, allowing no signal to pass. In this case the earliest received multipath signal 810 will correspond to the multipath signal received along shortest available path between the transmitter and receiver. Again, this is because the propagation time of the signal between the transmitter and the receiver is directly proportional to the distance the signal travels.

Of the remaining multipath components of the incoming signals, the receiver will acquire one multipath signal 820 for processing and decoding (i.e., it will determine that one multipath signal 820 of the signal is of sufficient quality to process and will lock onto that signal). This acquired multipath signal 820 may not be the earliest multipath signal 810, and may not even be the strongest multipath signal received.

The Basic Ranging Algorithm

One basic ranging method involves the straightforward exchange of ranging packets. If one device sends a first ranging packet to another device and receives a second ranging packet in return, it can determine the distance between the devices with only a small amount of information about the timing of that packet exchange.

Figure 9A:
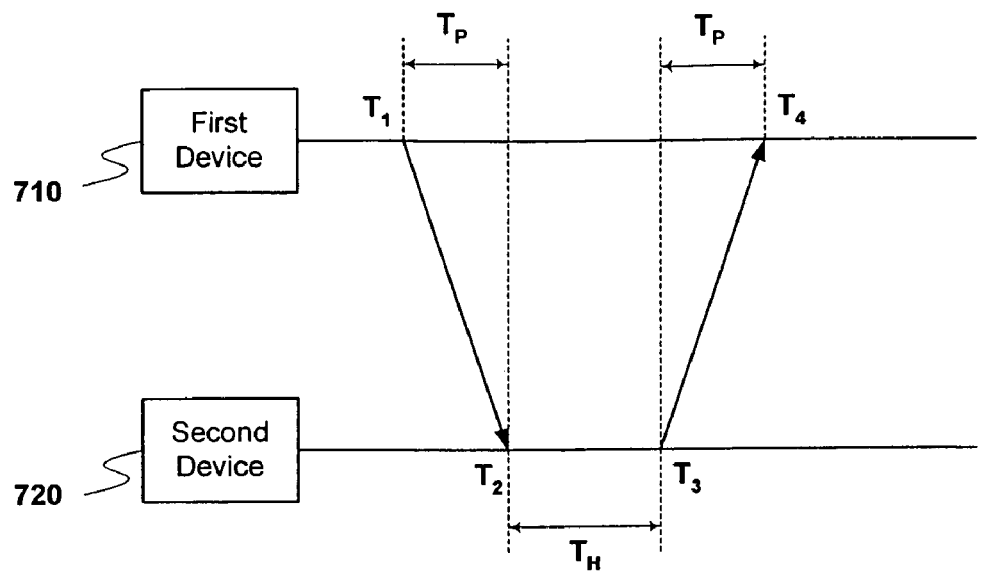
FIG. 9B is a message sequence chart showing the packet exchange of FIG. 9A.
Figure 9B:
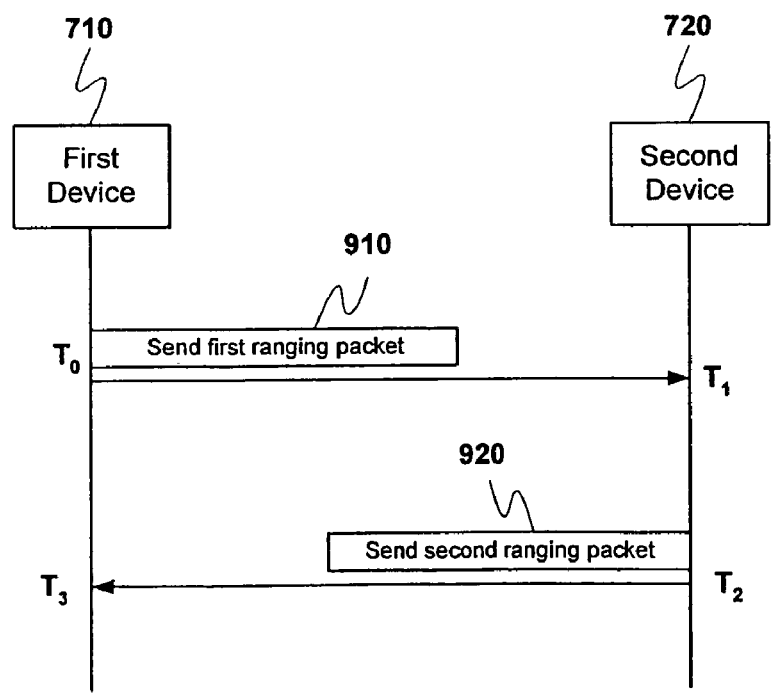

FIG. 9A is a timing diagram showing an exchange of ranging packets between two devices in a wireless network, according to a preferred embodiment of the present invention. FIG. 9B is a message sequence chart showing the packet exchange of FIG. 8A.

As shown in FIGS. 9A and 9B, the first device 710 begins by sending a first ranging packet 910 at a first time $T_1$ to the second device 720. The second device 720 receives the first ranging packet 910 at a second time $T_2$, where $$T_2 = T_1 + T_P. \tag{2}$$

In this equation, $T_P$ is the propagation time that it takes for the first ranging packet 910 to travel from the first device 710 to the second device 720.

The second device 720 then holds onto the first ranging packet 910 for a hold time $T_H$, and sends a second ranging packet 920 to the first device 710 at a third time $T_3$, where $$T_3 = T_2 + T_H. \tag{3}$$

This hold time $T_H$ can represent the circuit delay required to process the incoming signal, the circuit delay to prepare the outgoing signal, etc. In the preferred embodiment this second ranging packet 920 has the same format as the first ranging packet 910, but will include different timing information if such information is passed in the ranging packet. However, in alternate embodiments it could be a different packet, so long as it is identified as a ranging packet. For example, in some embodiments the ranging packet may not need any timing information.

The first device 710 then receives the second ranging packet 920 at a fourth time $T_4$, where $$T_4 = T_3 + T_P. \tag{4}$$

If the first device 710 receives measurements for either the second time $T_2$ or the third time $T_3$ in the second ranging packet 920, it can determine the propagation time $T_P$ by using Equation (2) or Equation (4), or as they can be rewritten:

$$T_P = (T_2 - T_1), \text{ or} \tag{5}$$

$$T_P = (T_4 - T_3). \tag{6}$$

However, the clock in the first device 710 may not be perfectly synchronized with the clock in the second device 720, being off in either phase or frequency. Thus, the measurement of first and fourth times $T_1$ and $T_4$ from the first device 710 may not be in the same frame of reference as the measurement of the second and third times $T_2$ and $T_3$ from the second device 720. Furthermore, even if they are, the accuracy of the clock in the first device may be much more accurate than the clock in the second device.

As a result, of this, even if the first device 710 receives measurements of either the second or third times $T_2$ and $T_3$ from the second device 720, the propagation time $T_P$ may not be accurately determined by Equation (5) or Equation (6). It may be that the first device cannot trust these values to be accurate. While Equations (5) and (6) are true for values measured in absolute terms, it may be difficult to provide accurate values for times from two different devices in the same frame of reference or at the same degree of accuracy.

The first device 710 only knows with certainty the time that it transmitted the first ranging packet 910 (the first time $T_1$), and the time that it received the second ranging packet 920 (the fourth time $T_4$). However, the as shown in Equation (3), the second and third times $T_2$ and $T_3$ are related to the hold time $T_H$. By solving Equation (3) for $T_H$, it can be shown that $$T_H = T_3 - T_2. \tag{7}$$

The hold time $T_H$ in the second device 720 is a mix of physical delays (e.g., in the PHY layer 410) and process delays (e.g., in the MAC layer 420). Furthermore, the hold time $T_H$ is a duration rather than a time determined relative to a reference time. As a result, the hold time $T_H$ can be determined by the second device 720 without reference to the clock of the first device 710, and without any loss of accuracy. If the physical delays are known, then the hold time $T_H$ can be a known, predictable time period.

In preferred embodiments the physical delay aspects of the hold time $T_H$ for each device could be determined during manufacturing and stored in the device's memory. The process delay aspects of the hold time $T_H$ can be set by the device as needs, and can be either variable or fixed as needed.

If the first device 710 knows the hold time $T_H$ from the second device 720, it can determine the propagation time $T_P$ (i.e., the time of flight for the packets) by combining Equations (5), (6), and (7) as follows:

$$\begin{aligned}
2 \cdot T_P &= (T_2 - T_1) + (T_4 - T_3) \\
&= (T_2 - T_3) + (T_4 - T_1) \\
&= (T_4 - T_1) - (T_3 - T_2) \\
&= (T_4 - T_1) - T_H, \text{ or}
\end{aligned} \tag{8}$$

$$T_P = \frac{(T_4 - T_1 - T_H)}{2} \tag{9}$$

However, while this measurement method eliminates any dependence upon the second and third times $T_2$ and $T_3$ in determining the propagation time $T_P$, it retains a dependence on the hold time $T_H$ in the second device 720. This requires the second device 720 to both monitor the hold time $T_H$ and send it to the first device 710.

It is possible, however, to take measures that circumvent the inaccuracy of the hold time $T_H$ by sending two ranging packets from the first device 710 to the second device 720. In this method one ranging packet is delayed by a first hold time $T_{H1}$, and the other ranging packet is delayed by a second hold time $T_{H2}$ that is twice the first hold time, i.e., $2 * T_{H1}$.

If the first hold time $T_{H1}$ represents the physical time necessary for the second device 720 to process an incoming packet and send out a responding packet, it is relatively easy to delay a packet by the second hold time $T_{H2}$, since it is just twice the first hold time $T_{H1}$. If the physical aspects of the first hold time TH1 (which would be the same for the second hold time TH2) are known, the process aspects A straightforward way to accomplish this would be to process the packet twice, only sending a response packet on the second time through.

Figure 10A:
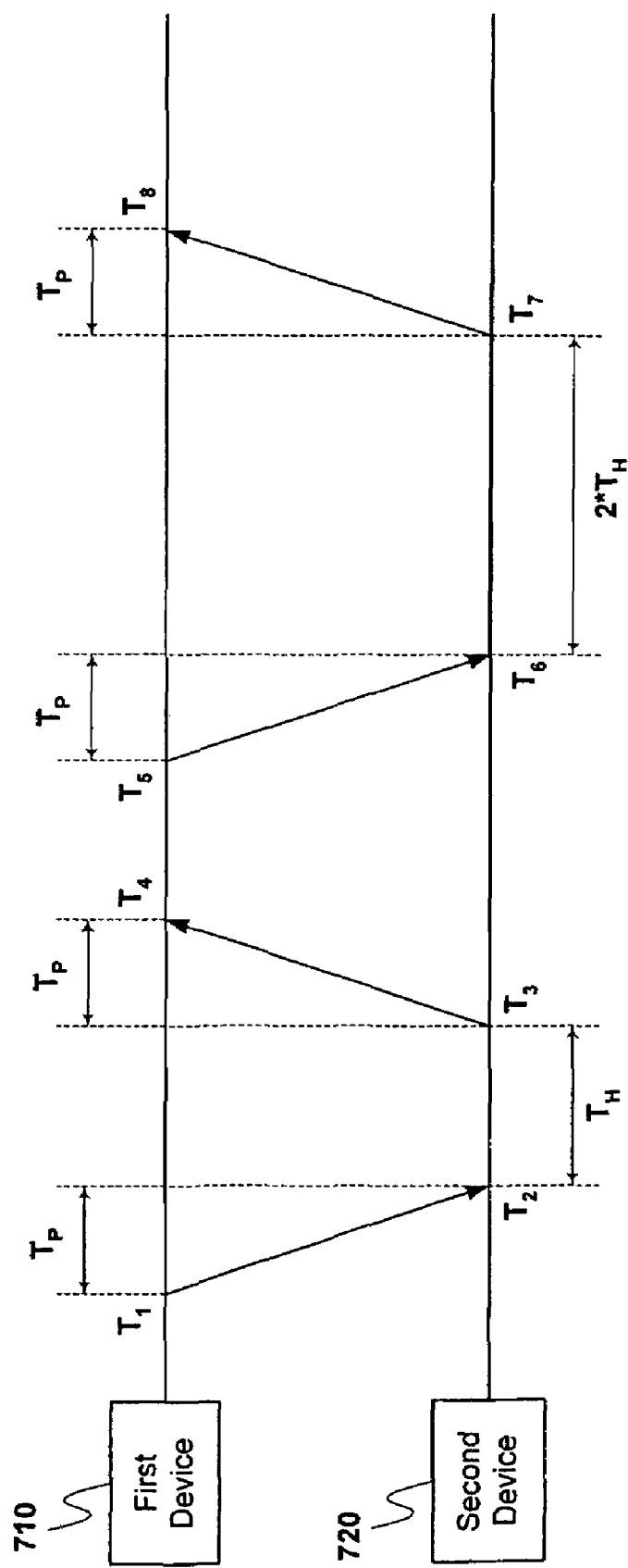
FIG. 10A is a timing diagram showing a double exchange of ranging packets between two devices in a wireless network, according to a preferred embodiment of the present invention.
Figure 10B:
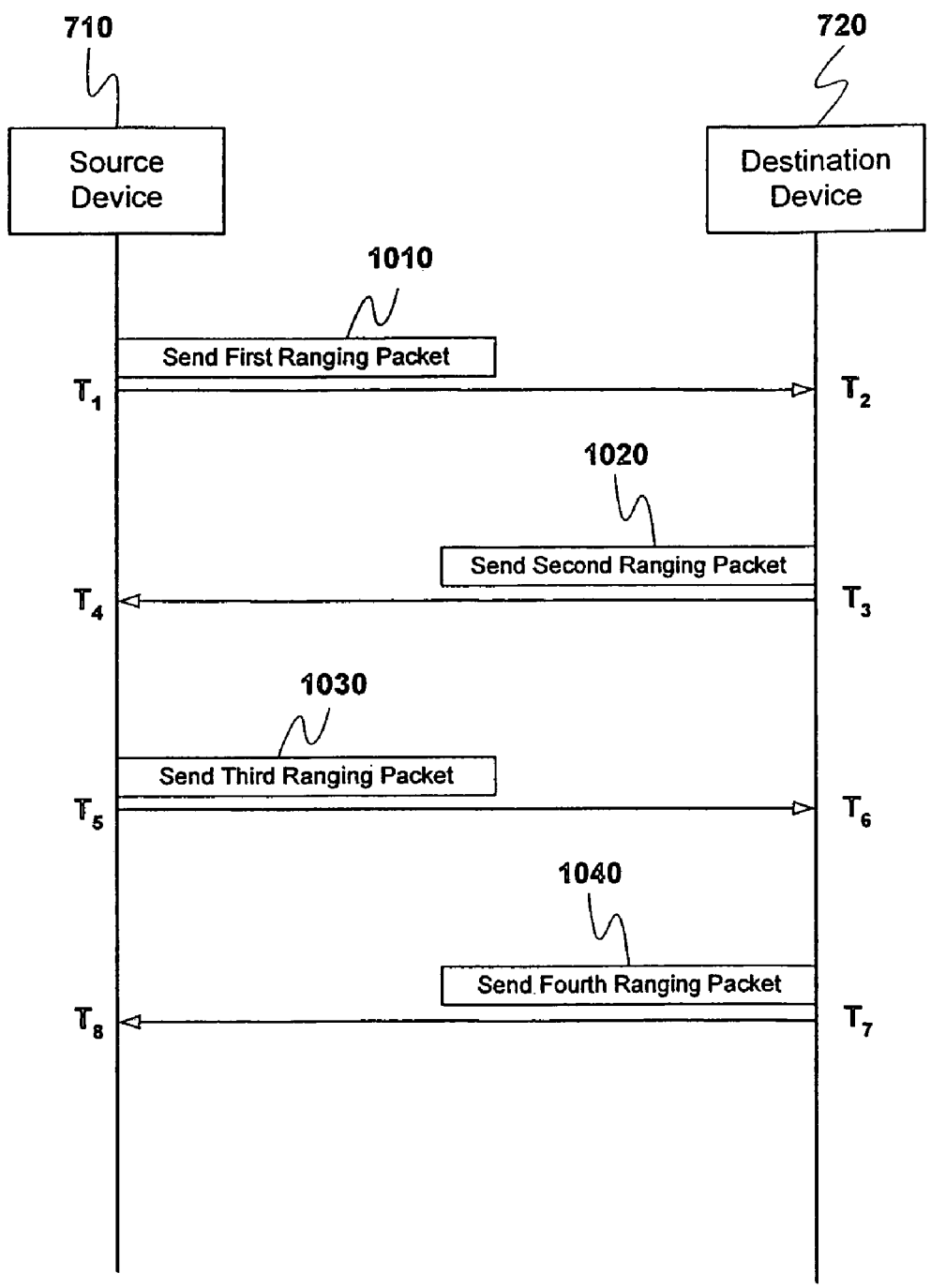
FIG. 10B is a message sequence chart showing the packet exchange of FIG. 10A.

FIG. 10A is a timing diagram showing a double exchange of ranging packets between two devices in a wireless network, according to a preferred embodiment of the present invention. FIG. 10B is a message sequence chart showing the packet exchange of FIG. 10A. As shown in FIGS. 10A and 10B, the exchange of first and second ranging packets 1010 and 1020 is similar to the packet exchange shown in FIGS. 9A and 9B.

In the first packet exchange, the first device 710 begins by sending a first ranging packet 1010 at a first time $T_1$ to the second device 120, as shown in FIGS. 10A and 10B. The second device 720 receives the first ranging packet 1010 at a second time $T_2$, holds onto the first packet 1010 for a first hold time $T_{H1}$, and sends a second ranging packet 1020 to the first device 710 at a third time $T_3$. The first device 710 then receives the second ranging packet 1020 at a fourth time $T_4$. This exchange follows Equations (2) to (9), as described above (with $T_{H1}=T_H$).

The first device 710 then sends a third ranging packet 1030 at a fifth time $T_5$ to the second device 720.

The second device 720 receives the third ranging packet at a sixth time $T_6$, where $$T_6 = T_5 + T_P. \tag{10}$$

As with Equation (2), $T_P$ is the propagation time that it takes for the third ranging packet 1030 to travel from the first device 710 to the second device 720.

The second device 720 then holds onto the third ranging packet 1030 for a second hold time $T_{H2}$ that is twice the first hold time $T_{H1}$, i.e., $$T_{H2} = 2 * T_{H1}, \tag{11}$$

and sends a fourth ranging packet 1040 to the first device 710 at a seventh time $T_7$, where $$T_7 = T_6 + T_{H2} = T_6 + 2 * T_{H1}. \tag{12}$$

The first device 710 then receives the fourth packet 1040 at a eighth time $T_8$, where $$T_8 = T_7 + T_P. \tag{13}$$

This timing information can then be used to determine the first hold time $T_{H1}$ as a function of the fifth time $T_5$, the eighth time $T_8$, and the propagation time $T_P$ as follows:

$$\begin{aligned} 2 \cdot T_P &= (T_6 - T_5) + (T_8 - T_7), \text{ or} \\ &= (T_6 - T_7) + (T_8 - T_5) \\ &= (T_8 - T_5) - (T_7 - T_6) \\ &= (T_8 - T_5) - 2 \cdot T_{H1} \end{aligned} \tag{14}$$

$$T_{H1} = \frac{(T_8 - T_5 - 2T_P)}{2} \tag{15}$$

This value can then be used in Equation (9) to show the following equality:

$$T_P = \frac{\left(T_4 - T_1 - \frac{(T_8 - T_5 - 2T_P)}{2}\right)}{2}, \tag{16}$$

which can be simplified to $$T_P = T_4 - T_1 + \frac{(T_8 - T_5)}{2}. \tag{17}$$

by solving for $T_P$. Thus, by having two separate packet exchanges, it is possible for the first device 710 to find the propagation time $T_P$ as a function of only the first, fourth, fifth, and eighth times $T_1$, $T_4$, $T_5$, and $T_8$.

Since the first device 710 knows the values for the first, fourth, fifth, and eighth times $T_1$, $T_4$, $T_5$, and $T_8$ with certainty, it is possible for it to determine the propagation time $T_P$ without subjecting that determination to any uncertainty caused by the first and second hold times $T_{H1}$ and $T_{H2}$ in the second device 720. The primary cost for this certainty is that it must send and receive two sets of ranging packets rather than one.

In fact, to male the determination of the propagation time $T_P$ in this embodiment, all the first device 710 need do is determine two time durations: a first time duration $T_{1-4}$ and a second time duration $T_{8-5}$. The first time duration $T_{4-1}$ is the elapsed time from when the first device 710 transmits the first ranging packet 1010 to the second device 720, to when it receives the second ranging packet 1020 from the second device 720, as shown in the following equation:

$$T_{4-1} = T_4 - T_1. \tag{18}$$

The second time duration $T_{8-5}$ is the elapsed time from when the first device 710 transmits the third ranging packet 1030 to the second device 720, to when it receives the fourth ranging packet 1040 from the second device 720, as shown in the following equation:

$$T_{8-5} = T_8 - T_5. \tag{19}$$

These first and second time durations $T_{1-4}$ and $T_{8-5}$ are relatively simple for the first device 710 to determine since they can be done entirely using the local clock in the first device 710.

The first device 710 can then use the first and second time durations $T_{1-4}$ and $T_{8-5}$ to determine the propagation time $T_P$ by using Equations (17), (18), and (19), as follows:

$$T_P = T_{4-1} + \frac{T_{8-5}}{2}. \tag{20}$$

Although FIGS. 10A and 10B show the first packet exchange (i.e., the exchange of the first and second ranging packets 1010 and 1020 with a delay of $T_H$ at the second device 720) taking place prior to and separate from the second packet exchange (i.e., the exchange of the third and fourth ranging packets 1030 and 1040 with a delay of $2*T_H$ at the second device 720), in alternate embodiments the order of these could be switched, and they could overlap.

Furthermore, it is possible to eliminate the third ranging packet altogether, In this embodiment the second device 720 simply responds to the first ranging packet twice, sending a ranging packet once after a first hold time $T_{H1}$, and again after a second hold time $T_{H2}$. The first device 710 can then use the time differences between the sending of the first packet and receiving both of these reply packets as shown in Equation (20).

In addition, although in the disclosed embodiment the second hold time $T_{H2}$ is twice the first hold time $T_{H1}$, alternate embodiments can use a different relationship between these hold times. As long as the relationship is known between the first and second hold times $T_{H1}$ and $T_{H2}$, that relationship can be factored out of the equation to determine the propagation time $T_P$, as shown in the above. For example, if $$T_{H2} = N * T_{H1}, \tag{21}$$

then $$T_{H1} = \frac{(T_8 - T_5 - 2T_P)}{N}, \tag{22}$$

which can be factored into Equation (9) to determine $T_P$ (assuming $T_{H1}=T_H$).

Furthermore, in some implementations it may be necessary to perform ranging using supplemental packet transmissions. For example, if an embodiment is used that requires the first device 710 to determine the propagation time $T_P$ using Equation (6), the second device 720 may have to send a later packet providing a measurement for the third time $T_3$. Since the second device 720 will not know this time measurement until the second ranging packet 920 is being sent, and so cannot include it in the second ranging packet 920. However, the first device 710 can still determine the reception time for the second packet 920, and need only await the later packet to get the information necessary to calculate the propagation time $T_P$. The same strategy can be used for other embodiments for which information is gathered by the second device 720 too late to include it in either a second ranging packet 920, 1020, or a fourth ranging packet 1040.

Also, although FIGS. 9A and 10A show calculations using transmission times and a reception times, these calculations could also include known circuit delay times related to both transmission and reception. For example, the time measurement for the transmission time for one of the devices 710, 720 could be made at a transmission delay time $T_{TD}$ before the actual transmission was made. Similarly, the time measurement for the reception time for one of the devices 710, 720 could be made at a reception delay time $T_{RD}$ after the actual transmission. Such delay times were ignored in the above discussion for simplicity. However, they could easily be included and the above equations adjusted accordingly. And since these various delay times $T_{TD}$ and $T_{RD}$ can be determined for each device, they can be used in the equations and will not prevent the propagation time $T_P$ from being calculated using the methods described above.

Furthermore, each of the reception times discussed above ($T_2$, $T_4$, $T_6$, and $T_8$) are assumed to be times that the earliest multipath portion of the packet is received by the respective device 710, 720. In most cases the actual time of acquisition by the device 710, 720 will be different, and the measured values will have to be corrected to account for this difference. An exemplary correction method is disclosed below.

The relationship between the propagation time $T_P$ and the range between the two devices 710 and 720 is fixed by the speed of light. The wireless packets sent between the two devices 710 and 720 travel at the speed of light. Therefore, the distance they travel is equal to the propagation time $T_P$ multiplied by the speed of light. Put mathematically, this relationship is shown as follows:

$$R=T_P*c \qquad (23)$$

where R is the range between the devices, $T_P$ is the propagation time for a packet sent along a shortest transmission path, and c is the speed of light.

Figure 6:
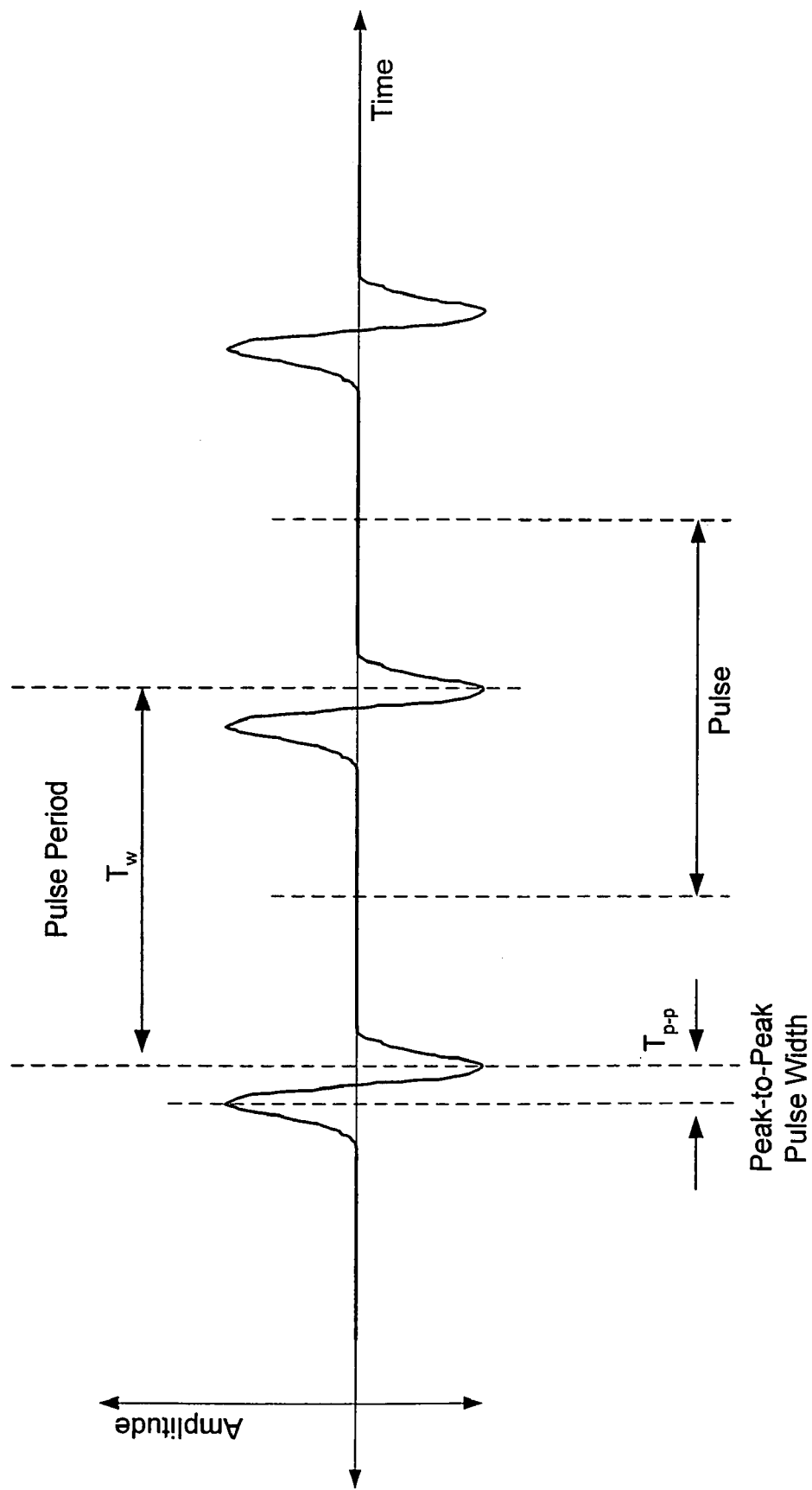
FIG. 6 is a graph showing an exemplary UWB wavelet stream.

One realization of the transceiver signaling mechanism may use a coded signal to improve the signal-to-noise ratio of the received multipath components. Such a code may consist of multiple wavelets (e.g., the wavelets shown in FIG. 6), where the energy from each wavelet in the code is integrated over the duration of the code.

There are two important considerations for the use of codes in ranging: (1) the autocorrelation side lobes for the code should be as small as possible to avoid unwanted interference from adjacent multipath components; and (2) the code length must be at least as long as the channel impulse response decay time to eliminate inter-symbol interference in the ranging process.

There are a number of code families that satisfy the properties of the first criteria. In a preferred embodiment, 13-bit barker sequences are used for the code words. In alternate embodiments, Golay code pairs can be used, the response from each pair averaged. This can eliminate the autocorrelation side lobes, since the side lobe structures from Golay code pairs are identical, but with reversed polarity. Such an embodiment requires the ability to rapidly alternate the transmission of different codes, however.

In various embodiments the second criteria can be met with very long codes or a digital overlay code used to modulate the wavelet code. While digital overlay codes will not have ideal autocorrelation properties, the implementation of such a digital overlay code may require less complexity in both the transmitter and receiver than an analog code of similar length.

Finding the Direct Line of Sight Path

As described above, it is possible to determine the propagation time $T_P$ for the acquired signal by a variety of methods, each involving a measurement of at least one transmission time and at least one reception time.

Measuring transmission time is relatively simple. A single device 710, 720 is transmitting a single copy of the signal, and can determine the time it begins transmission.

However, as shown in FIG. 8, situation is not so simple at the receiver. Because of signal reflections, multiple copies 810, 820, 830 of the transmitted signal arrive at the receiver at different times. And the signal copy 820 acquired by the receiver (and therefore forming the basis for any measurement of time of receipt) may not be the shortest path signal copy 810.

Thus, although each device can easily determine a reception time for an incoming signal, that reception time may not necessarily be the time that the receiver would have received the signal if it acquired the copy that traveled along the shortest path. Thus, the actual time measured by either device 710, 720 for receiving the signal may be larger than it should be for accurate distance measurement.

It is therefore necessary to correct the measured time of signal reception in each device to adjust it to reflect the actual time that the incoming signal arrived at the receiver along the shortest available path (generally the DLOS path 730).

Figure 11:
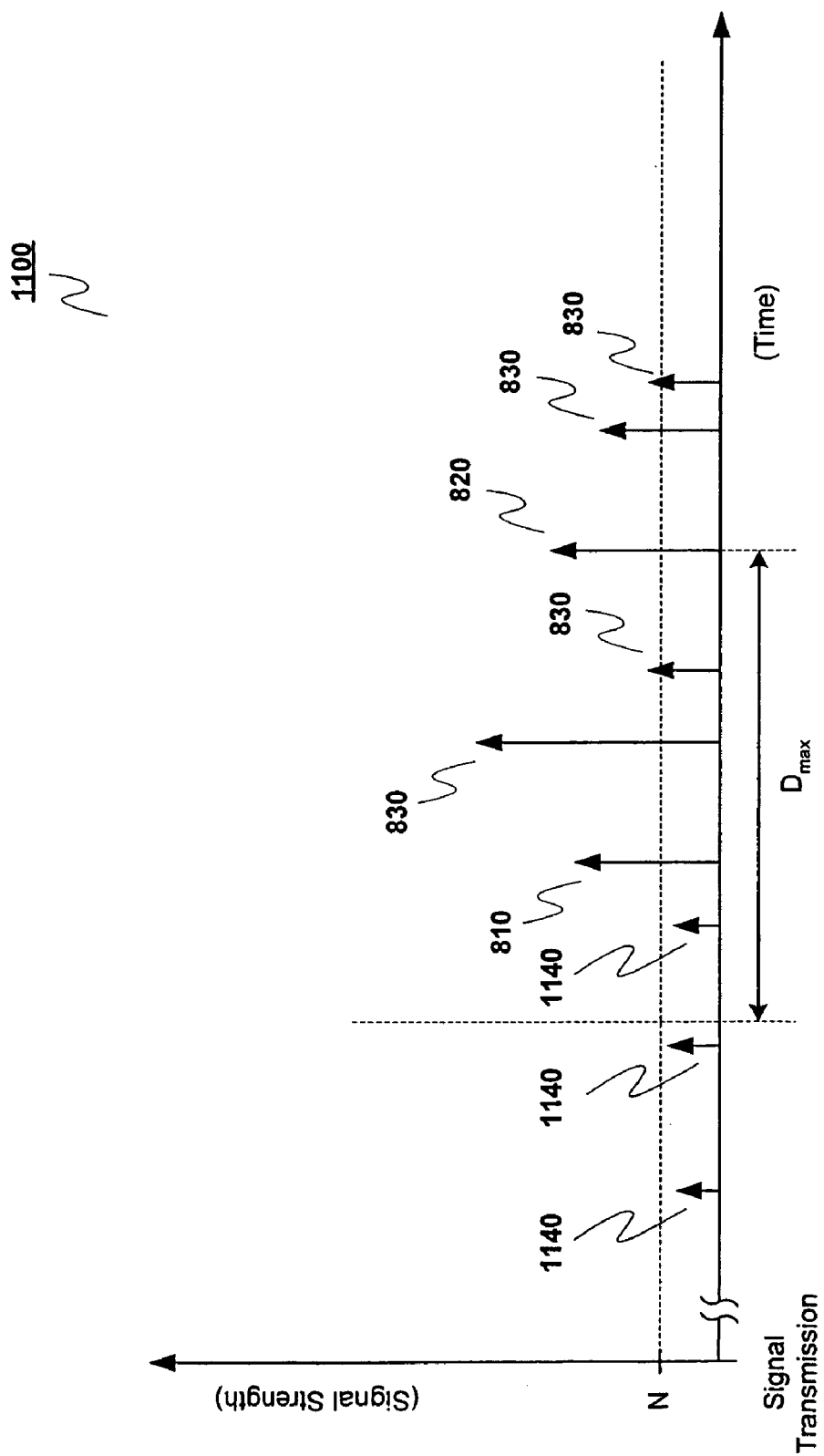
FIG. 11 is a graph of channel response for signals transmitted between two devices according to a preferred embodiment of the present invention.

FIG. 11 is a graph of channel response for signals transmitted between two devices according to a preferred embodiment of the present invention. As shown in FIG. 11, when a transmitter (e.g., the first device 710) sends a wireless signal to the receiver (e.g., the second device 720), the receiver will generally detect multiple copies 810, 820, 830 of the transmitted signal. These multiple copies 810, 820, 830 represent the various direct and reflected copies that are received at the receiver.

These copies include an earliest received signal copy 810, an acquired signal copy 820, and numerous other signal copies 830. In addition, there will be a certain amount of noise signals 1140 inherent in the system, which will be detected by the receiver, even before the earliest received signal arrives at the receiver.

In order to determine the timing of the earliest received signal copy 810 is, the receiver begins with the timing of the acquired signal 820 and begins looking backwards in phase from that arrival time to see what signals were received prior to the acquired signal. In a preferred embodiment this would be accomplished using multiple correlators in the receiver (sometimes called multiple arms or fingers). One correlator could maintain lock on the acquired signal, while another looked for signals received at an earlier phase, i.e., an earlier time.

In the preferred embodiment, the receiver will use a noise threshold N and a maximum delay measurement $D_{max}$ to perform this process. The noise threshold N represents the signal strength below which the receiver will consider an incoming signal noise; the maximum delay measurement $D_{max}$ represents the maximum time prior to the acquired signal 820 that the receiver will consider it possible for the earliest received signal 810 to be.

The receiver will examine signals received at a phase indicating a duration up to the maximum duration measurement $D_{max}$ and will measure any of these signals against the noise threshold. N. It will then consider the earliest signal that is both within the maximum duration measurement $D_{max}$ and above the noise threshold N to be the earliest received signal copy 810.

Once the receiver has determined the timing for the earliest received signal copy 810, it can then use this value to adjust correct the timing calculations of the system. This correction function need not be performed in real time with the packet transmission. In fact, in a preferred embodiment it is performed separate from the packet reception and transmittal, and the correction information is sent to the appropriate device and layer for processing at a later time (e.g., the second device 720 sends this information in a later packet to the first device 710).

Thus, although the actual measured times in a given ranging function may not be accurate, the above method can determine how the measured values should be adjusted to account for inaccuracies. For example, after a first device 710 has determined precise measured values for the fourth, fifth, and eighth times $T_4$, $T_5$, and $T_8$, adjustments will be made to these times during later processing based on the correction values determined at the first and second devices 710 and 720. Thus, the calculation of the propagation time will be made according to values that are corrected to reflect what they would have been had the first through fourth packets all been acquired on their earliest received multipath portion. As a result, the value $T_P$ will reflect the shortest transmission path, and so any distance calculation made using this value will represent the shortest signal path distance (generally the DLOS path 730).

Measuring Timing Epochs

One problem is how do you measure the timing epochs (i.e., the time that certain events occur at, such as a packet being sent or received)? One preferred method is based upon spread spectrum and establishes the time epoch by the use of a sliding correlator that detects a unique bit pattern.

In a preferred embodiment, bits of information are sent using a series of wavelets used to represent bits or groups of bits. Such a series of wavelets cane be referred to as a code word, with each code word representing either a single bit or a bit pattern of multiple bits. A sliding correlator can be used in a receiving device to detect the code words (i.e., the bit or bit pattern).

Figure 12:
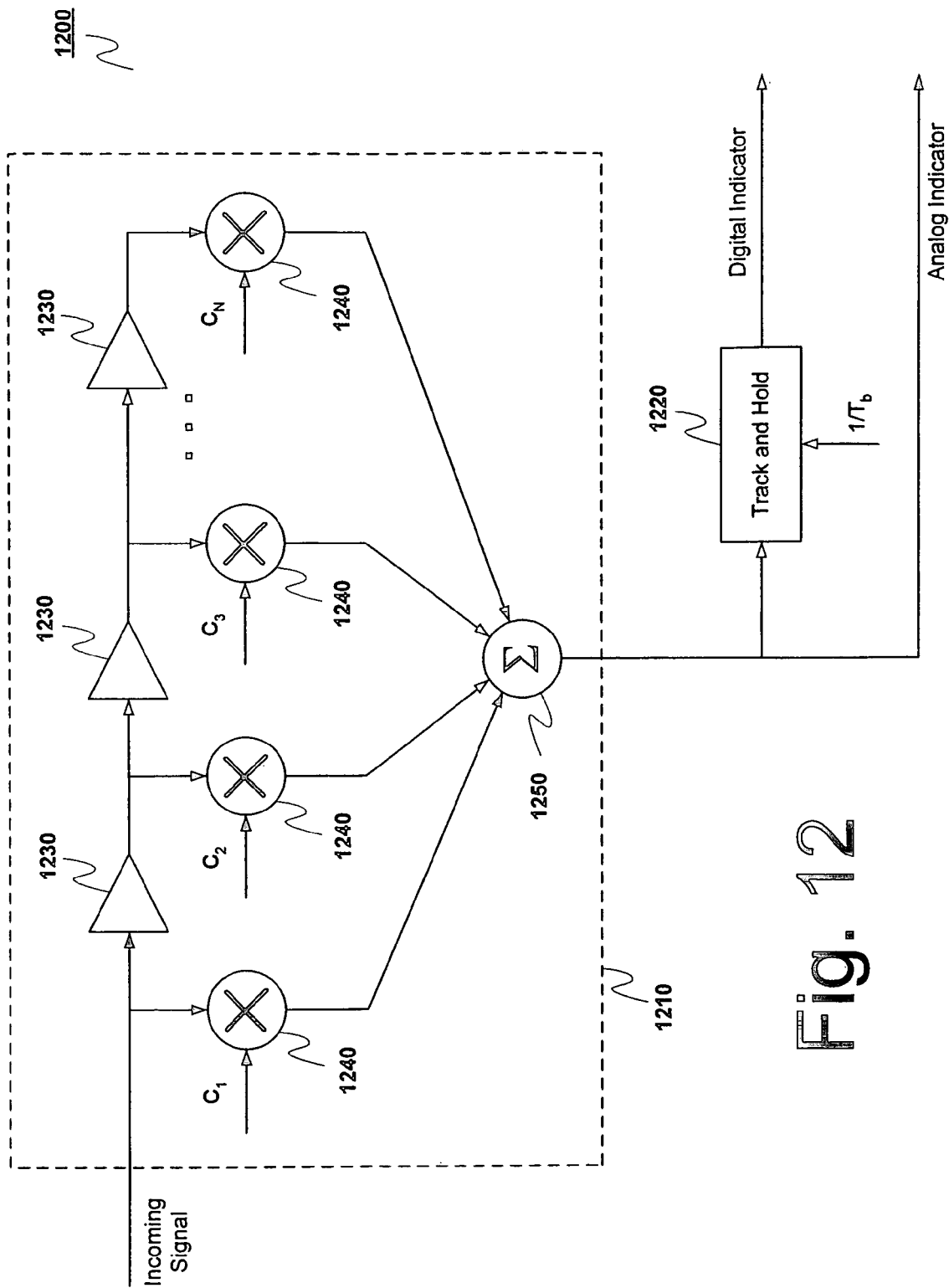
FIG. 12 is a block diagram showing a correlator circuit in a wireless receiving device, according to a preferred embodiment of the present invention.

FIG. 12 is a block diagram showing a correlator circuit in a wireless receiving device, according to a preferred embodiment of the present invention. As shown in FIG. 12, the correlator circuit 1200 includes a sliding correlator 1210 and a track and hold circuit 1220. The sliding correlator 1210 further includes (k−1) delays 1230, k mixers 1240 and a summer 1250.

An incoming signal received by the wireless receiving device is provided to the sliding correlator 1210, and is delayed by the (k−1) delays 1230 so that the first mixer 1240 receives the first pulse of the incoming signal and each subsequent mixer 1240 receives a subsequent pulse delayed by one wavelet period $T_w$. (See FIG. 1) Thus, the sliding correlator simultaneously checks k wavelets to see how well they correspond to the code word defined by the code word bits $C_1$ to $C_k$.

The output of each mixer 1240 reaches a maximum point when the two wavelets that it compares are identical (or a minimum point when the two wavelets are an inverse of each other). Since the summer 1250 adds the results of the k mixers 1240, its output reaches a maximum point when a series of k incoming pulses matches the code word defined by the code word bits $C_1$ to $C_k$ (or a minimum point when a series of k incoming pulses matches the inverse of the code word defined by the code word bits $C_1$ to $C_k$). By examining the output of the sliding correlator 1210, the receiving device can determine when a particular code word (or its inverse) has been received.

By determining the exact timing that this correlation maximum (or minimum) is met, the receiving device can determine the timing epoch of the received code word. When a known series of code words is received (e.g., in a preamble 510 of a packet 500), the timing epoch of the packet 500 can be determined by determining the timing epoch of a known code word in that packet 500. This is how the receiver locks onto a strong multipath component.

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://www.iee802.org/15/pub/TG3.html. Nothing in this disclosure should be considered to be incompatible with the draft 802.15.3 standard, as set forth on the IEEE 802 LAN/MAN Standards Committee web page.

Obviously, numerous modifications and variations of the present invention are possible in light of the above teachings. It is therefore to be understood that within the scope of the appended claims, the invention may be practiced otherwise than as specifically described herein.

We claim:

1. A method of determining a propagation time in a signal path of a wireless network, comprising:
    sending a first ranging packet from a local device to a remote device at a first time;
    receiving a second ranging packet at the local device at a second time, where the second time is equal to the first time plus twice a propagation time between the local device and the remote device, plus a first hold time at the remote device;
    sending a third ranging packet from the local device to the remote device at a third time;
    receiving a fourth ranging packet at the local device at a fourth time, where the fourth time is equal to the third time plus twice the propagation time, plus a second hold time at the remote device, the second hold time being different from the first hold time; and
    calculating the propagation time at the local device as a function of the first time, the second time, the third time, the fourth time, and a proportion between the first hold time and the second hold time.

2. A method of determining a propagation time in a signal path of a wireless network, as recited in claim 1, further comprising calculating a distance between the local device and the remote device to be equal to the propagation time multiplied by the speed of light.

3. A method of determining a propagation time in a signal path of a wireless network, as recited in claim 1, wherein the second hold time is twice the first hold time.

4. A method of determining a propagation time in a signal path of a wireless network, as recited in claim 3, wherein the propagation time is equal to the difference between the second time and the first time minus half the difference between the fourth time and the third time.

5. A method of determining a signal path distance in a wireless network, as recited in claim 1,
    wherein the second ranging packet comprises a plurality of multipath components arriving at different times at the local device, and
    wherein the second time represents an earliest received time at which an earliest multipath component from the plurality of multipath components arrives at the local device.

6. A method of determining a signal path distance in a wireless network, as recited in claim 1,
    wherein the fourth ranging packet comprises a plurality of multipath components arriving at different times at the local device, and
    wherein the fourth time represents an earliest received time at which an earliest multipath component from the plurality of multipath components arrives at the local device.

7. A method of determining a signal path distance in a wireless network, as recited in claim 1, wherein the first, second, third, and fourth ranging packets are encoded.

8. A method of determining a signal path distance in a wireless network, as recited in claim 7, wherein the first, second, third, and fourth ranging packets are encoded using Golay code pairs.

9. A method of determining a propagation time in a signal path of a wireless network, comprising:
    receiving at a remote device at a second time, a first ranging packet sent from a local device at a first time, where the second time is equal to the first time plus a propagation time;
    sending a second ranging packet from the remote device to the local device at a third time, where the third time is equal to the second time plus a first hold time;
    receiving at the remote device at a sixth time, a third ranging packet sent from the local device at fifth time, where the sixth time is equal to the fifth time plus the propagation time; and
    sending a fourth ranging packet from the remote device to the local device at a seventh time, where the seventh time is equal to the sixth time plus a second hold time, the second hold time being different from the first hold time.

10. A method of determining a signal path distance in a wireless network, as recited in claim 9,
    wherein the first ranging packet comprises a plurality of multipath components arriving at different times at the remote device, and
    wherein the second time represents an earliest received time at which an earliest multipath component from the plurality of multipath components arrives at the remote device.

11. A method of determining a signal path distance in a wireless network, as recited in claim 10, further comprising:
    acquiring an acquired multipath component at the remote device from the plurality of multipath components, the acquired multipath component being different from the earliest received multipath component;
    identifying the earliest received multipath component by processing the acquired multipath component and the plurality of received multipath components;
    determining the second time to be an earliest received time associated with the earliest received multipath component.

12. A method of determining a signal path distance in a wireless network, as recited in claim 11, wherein the step of identifying the earliest received multipath component further comprises:
    identifying all incoming signals received at the remote device within a maximum duration prior to receiving the acquired multipath component;
    comparing the received incoming signals to a noise threshold;
    locating an earliest received incoming signal that is above the noise threshold; and
    determining the earliest received incoming signal to be the earliest received multipath component.

13. A method of determining a signal path distance in a wireless network, as recited in claim 9,
    wherein the third ranging packet comprises a plurality of multipath components arriving at different times at the remote device, and
    wherein the fifth time represents an earliest received time at which an earliest multipath component from the plurality of multipath components arrives at the remote device.

14. A method of determining a signal path distance in a wireless network, as recited in claim 13, further comprising:
    acquiring an acquired multipath component at the remote device from the plurality of multipath components, the acquired multipath component being different from the earliest received multipath component;
    identifying the earliest received multipath component by processing the acquired multipath component and the plurality of received multipath components;
    determining the fifth time to be an earliest received time associated with the earliest received multipath component.

15. A method of determining a signal path distance in a wireless network, as recited in claim 14, wherein the step of identifying the earliest received multipath component further comprises:
    identifying all incoming signals received at the remote device within a maximum duration prior to receiving the acquired multipath component;
    comparing the received incoming signals to a noise threshold;
    locating an earliest received incoming signal that is above the noise threshold; and
    determining the earliest received incoming signal to be the earliest received multipath component.

16. A method of determining a signal path distance in a wireless network, as recited in claim 9, wherein the first, second, third, and fourth ranging packets are encoded.

17. A method of determining a signal path distance in a wireless network, as recited in claim 14, wherein the first, second, third, and fourth ranging packets are encoded using Golay code pairs.

18. A method of determining a propagation time in a signal path of a wireless network, comprising:
    receiving at a remote device a plurality of multipath components of a first ranging packet, arriving at different times, the first ranging packet being sent from a local device at a first time, acquiring an acquired multipath component at the remote device from the plurality of multipath components, the acquired multipath component being different from an earliest received multipath component;

identifying the earliest received multipath component by processing the acquired multipath component and the plurality of received multipath components;

determining a second time to be an earliest received time at which the earliest received multipath component from the plurality of multipath components arrives at the remote device; and sending a second ranging packet from the remote device to the local device at a third time, wherein the third time is equal to the second time plus a hold time.

19. A method of determining a signal path distance in a wireless network, as recited in claim 10, wherein the step of identifying the earliest received multipath component comprises:

identifying all incoming signals received at the remote device within a maximum duration prior to receiving the acquired multipath component;

comparing the received incoming signals to a noise threshold;

locating an earliest received incoming signal that is above the noise threshold; and determining the earliest received incoming signal to be the earliest received multipath component.

20. A method of determining a signal path distance in a wireless network, as recited in claim 19, wherein the first and second ranging packets are encoded.

21. A method of determining a signal path distance in a wireless network, as recited in claim 20, wherein the first and second ranging packets are encoded using Golay code pairs.

* * * * *